May 28, 1935.  H. M. MATTERS  2,002,959
LIQUID DISPENSING RECEPTACLE
Filed Dec. 9, 1933
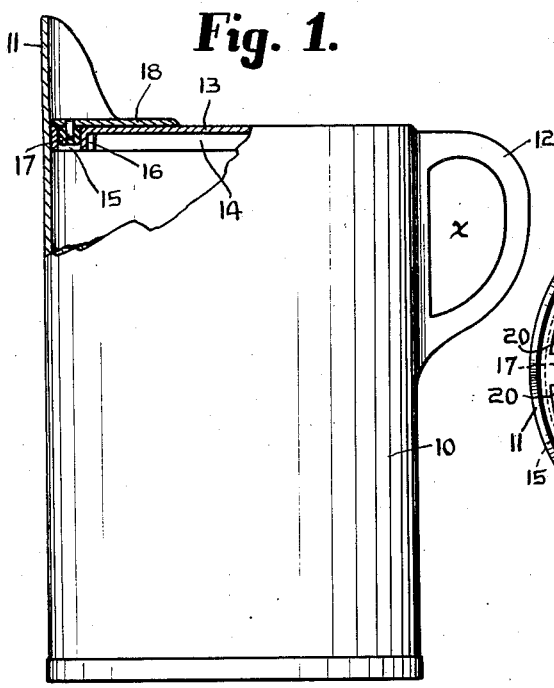
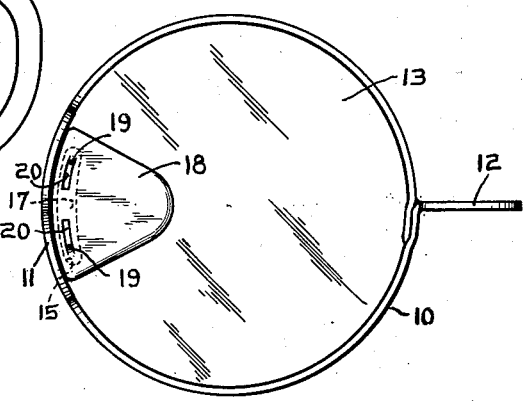
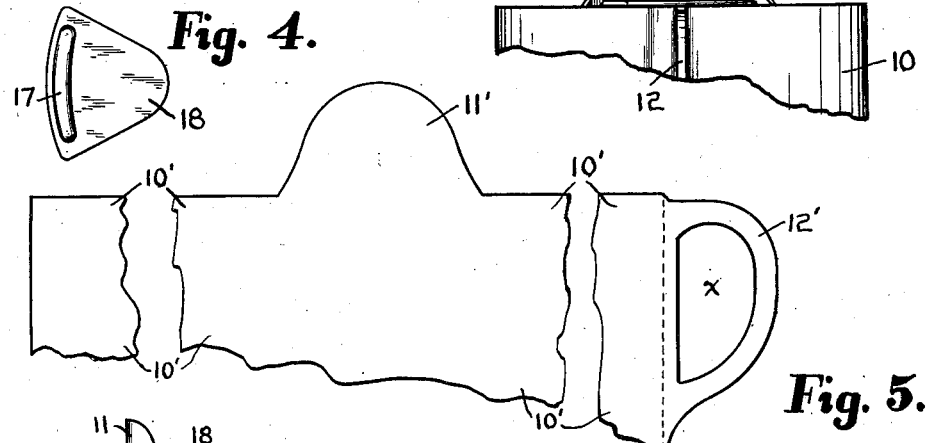
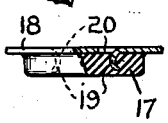
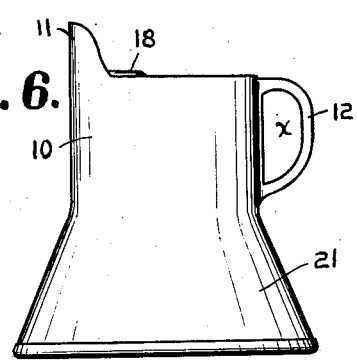
Inventor
H. M. Matters
By Hiram A. Sturges
Attorney Patented May 28, 1935

2,002,959

UNITED STATES PATENT OFFICE 2,002,959

LIQUID DISPENSING RECEPTACLE

Helen M. Matters, Omaha, Nebr.

Application December 9, 1933, Serial No. 701,625

4 Claims. (Cl. 221—11)

This invention relates to an improvement in that class of receptacles used commercially in the sale of liquid foods, such as condensed milk, syrups and the like, and has for its object, broadly, to provide a receptacle which may be manufactured practically and economically, will be of such construction that, when filled with the product, they may be packed or stacked one upon the other for shipments without injury or causing leakage, each receptacle to be provided with a spout and handle so that the contents may be dispensed, in whole or in part, at time of use.

The invention specifically relates to the provision of the spout and handle and discharge port of the dispensing receptacle.

With the foregoing objects in view, the invention presents a new and useful construction, combination and arrangement of parts as described herein and claimed, and as illustrated in the accompanying drawing, it being understood that changes may be made in form, size, proportions and minor details as found to be of advantage, said changes being within the scope of the invention as claimed.

In the drawing, Fig. 1 is a side view of a dispensing receptacle embodying my invention, parts being in section, and Fig. 2 is a top plan view of the same.

Fig. 3 is a view showing the upper part of the dispensing receptacle looking toward the spout thereof.

Fig. 4 is a bottom plan view of the closure-piece for the discharge port of the receptacle.

Fig. 5 is a plan view of a blank strip used in providing the cylindrical wall and handle and spout for the receptacle.

Fig. 6 is a view in side elevation of a dispensing receptacle provided with a downwardly divergent base, and being a modified form of the invention.

Fig. 7 is an end view, partly in section, of the closure-piece for discharge port of the receptacle.

Referring now to the drawing for a more particular description, numeral 10 indicates the upright cylindrical wall of a receptacle adapted for use in the distribution and sale of liquids to be dispensed, and in Fig. 1 of the drawing it is shown as an ordinary can provided with a spout 11 and handle 12, the top 13 of the receptacle having a downwardly projecting flange 14 secured to the vertical cylindrical wall 10.

The spout has a transverse curvature conforming to the curvature of the wall 10, and is disposed in alignment with said wall, parallel with the longitudinal axis of said cylindrical receptacle, and the handle 12 is disposed diametrically opposite to said spout.

Numeral 15 indicates a curved slot having a length nearly equal to the width of the spout.

The outer wall of the slot consists of that part of the flange 14 which lies immediately below the spout, and therefore it may be said that the curvature of the outer wall of the slot conforms approximately to the transverse curvature of the spout.

While the inner wall of the slot 15 is of curved form, its degree of curvature is less than that of its outer wall, and therefore the part of greatest width of the slot is that part mid-way between its convergent end-portions.

It has been ascertained in the practice of the invention, that the particular form of this discharge port, as described, provides an important advantage in the control of the flow when dispensing the liquid.

By referring to Fig. 1 of the drawing, it will be seen that, in the formation of the slot, a downwardly projecting lip or wall 16 is formed for the slot.

Numeral 17 indicates an arcuate or transversely curved closure-piece for the slot, its form, in plan, corresponding to the form of the slot, and when inserted therein it is supported by the lip or bearing wall 16 and flange 14, and no leakage will occur at said discharge port in the use of this closure-piece.

The closure-piece 17 may be readily removed from the slot since it is provided with a lifting-plate or stabilizer 18 having prongs 19 of hook-form which are embedded in said closure-piece so that it will not become detached therefrom.

The plate or stem 18 is normally disposed in engagement with the top of the can, and therefore will not be obtrusive, and will not prevent the operation of packing, and will permit the receptacles to be disposed one upon another in stacks as usual when making shipments.

The closure-member 17 may be readily removed from the slot by inserting a knife-blade or similar tool beneath the plate 18 which then operates as a lever for said removal.

The closure-piece 17 may be constructed of any suitable material, and vulcanized rubber may be used to advantage.

The prongs or hooks 19 may be provided by incising the plate 18 as indicated at 20 in Fig. 2 of the drawing, and bending the prongs downwardly to the position shown in Fig. 7 of the drawing.

The modified form for a receptacle shown in Fig. 6, does not differ materially from the construction already described except that it is provided with an enlarged base 21, and this modified form is included in the present invention.

The cylindrical wall, handle and spout may be conveniently constructed by use of the strip 10' which is provided at one of its ends with an extension 12' provided with an aperture x, said extension being adapted to be bent transversely at right-angles to said strip to form the handle, and having a projection 11' midway between its ends to provide the spout 11.

Among the advantages to be derived by use of the invention it may be stated that the flow of liquid on the spout, during the operation of pouring will be abruptly divided by the edge of said spout for the reason that all parts of the spout are in alignment with the cylindrical wall of the receptacle, and for the same reason no appreciable part of the liquid will adhere to the outer side of the spout, but when the flow is interrupted the unused liquid will quickly move downward and drain from the inner side of the spout.

Also on account of the location and form of the slot, as described, the liquid drained from the spout, will enter and pass through said slot. It is obvious that, unless the slot will receive the drainage from the spout the excess liquid will move down upon the top of the receptacle, but, by use of the parts as described, this unsanitary condition may be avoided.

I claim as my invention,—

1. In devices for the purpose described, a receptacle having an upright cylindrical wall, a transversely curved spout projecting from and disposed in alignment with a part of said cylindrical wall, a handle opposite the spout on a part of the cylindrical wall, the top of said receptacle being provided with a slot having a curvature corresponding approximately to the curvature of the spout and disposed closely adjacent thereto, and a closure-member adapted to fit snugly in the slot and provided with a lifting-plate normally engaging the top of the receptacle.

2. In devices for the purpose described, an upright receptacle having a top, a bottom and a cylindrical containing wall, said wall having a part disposed in alignment therewith projecting above the top of the receptacle parallel with the longitudinal axis thereof to provide a transversely curved spout, and provided with a handle; said top being provided with a slot having a curvature corresponding with and disposed closely adjacent to said spout, and a transversely curved closure-member provided with a lifting-plate and adapted to engage in said slot with its lifting-plate engaging the top of the receptacle.

3. In devices for the purpose described, an upright receptacle having a cylindrical side wall extending above its top to provide a transversely curved spout disposed in alignment with its side wall parallel with the longitudinal axis of the receptacle, the top of the receptacle being provided with a slot having a length nearly equal to the width of the spout and disposed closely adjacent thereto with a curvature corresponding approximately to the curvature of said spout, and an arcuate closure-member adapted to fit snugly in the slot and provided with a lifting-plate normally engaging the top of the receptacle.

4. In devices for the purpose described, a receptacle having an upright cylindrical wall, a transversely curved spout disposed in alignment with said cylindrical wall and projecting above the top of the receptacle, that part of the top of the receptacle adjacent the spout being incised and bent to provide a downwardly projecting bearing-wall and a slot having a curvature corresponding to the curvature of said spout, a transversely curved closure-member adapted to be mounted in the slot in engagement with said bearing-wall and including a lifting-plate for engaging the top of the receptacle.

HELEN M. MATTERS.